United States Patent
Ando (10) Patent No.: US 9,945,723 B2
(45) Date of Patent: Apr. 17, 2018

(54) INTERFEROMETER, SPECTROPHOTOMETER USING INTERFEROMETER AND CONTROL METHOD FOR INTERFEROMETER

(71) Applicant: HORIBA, Ltd., Kyoto (JP)

(72) Inventor: Yoshitake Ando, Kyoto (JP)

(73) Assignee: Horiba, Ltd., Kyoto (JP)

( * ) Notice: Subject to any disclaimer, the term of this patent is extended or adjusted under 35 U.S.C. 154(b) by 13 days.

(21) Appl. No.: 14/933,867

(22) Filed: Nov. 5, 2015

(65) Prior Publication Data
US 2016/0131528 A1    May 12, 2016

(30) Foreign Application Priority Data

Nov. 7, 2014    (JP) .................................. 2014-227166

(51) Int. Cl.
*G01J 3/453*    (2006.01)
*G01B 9/02*    (2006.01)
(Continued)

(52) U.S. Cl.
CPC ........ *G01J 3/4535* (2013.01); *G01B 9/02015* (2013.01); *G01J 3/0202* (2013.01); *G01J 3/06* (2013.01); *H02P 25/032* (2016.02)

(58) Field of Classification Search
CPC .......... G01J 3/4535; G01J 3/0202; G01J 3/06; G01B 9/02015; H02P 25/032
See application file for complete search history.

(56) References Cited

U.S. PATENT DOCUMENTS 3,488,123 A * 1/1970 Nichols ................. G01J 3/4535
356/452
4,639,604 A * 1/1987 Murakami ............. G01B 11/02
250/548
(Continued)

FOREIGN PATENT DOCUMENTS

CN    001275712 A    12/2000
CN    102564318 A     7/2012
(Continued)

OTHER PUBLICATIONS

EESR dated Mar. 16, 2016 issued for European Patent Application No. 15 193 466.8, 7 pgs.
(Continued)

*Primary Examiner* — Dominic J Bologna
(74) *Attorney, Agent, or Firm* — Brooks Kushman P.C.

(57) ABSTRACT

The present invention provides an interferometer and the like, that is capable of ensuring the speed stability of the movable mirror while achieving the speed up of the reciprocal movement of the moving mirror and suppressing the increment of the maximum instantaneous thrust force required for the turning back as much as possible. The interferometer includes a moving mirror, a movement mechanism for reciprocating the moving mirror, a movement control part for controlling the movement mechanism and allowing the moving mirror to be reciprocated at a constant speed, and a measurement part for measuring a position of the moving mirror. The movement control part is adapted to receive target position data indicating a target position of the moving mirror, and control the movement mechanism to bring the measurement position of the moving mirror measured by the measurement part close to the target position indicated by the target position data.

6 Claims, 8 Drawing Sheets

(51) Int. Cl.
*G01J 3/02* (2006.01)
*G01J 3/06* (2006.01)
*H02P 25/032* (2016.01)

(56) References Cited

U.S. PATENT DOCUMENTS

| | | | | |
|---|---|---|---|---|
| 6,322,037 B1* | 11/2001 | Nanko | ................. | G02B 7/1828 |
| | | | | 248/478 |
| 2001/0043450 A1* | 11/2001 | Seale | ........................ | F01L 9/04 |
| | | | | 361/160 |
| 2013/0249465 A1* | 9/2013 | Kirihara | .................. | H02P 29/00 |
| | | | | 318/632 |
| 2014/0327914 A1 | 11/2014 | Jackson | | |

FOREIGN PATENT DOCUMENTS

| CN | 103261868 A | 8/2013 |
|---|---|---|
| JP | 2001-194235 A | 7/2001 |
| JP | 2014-096038 A | 5/2014 |

OTHER PUBLICATIONS

Office Action dated Jan. 19, 2018 issued for Chinese Patent Application No. 201510751588.9, 10 pgs.

\* cited by examiner

INTERFEROMETER, SPECTROPHOTOMETER USING INTERFEROMETER AND CONTROL METHOD FOR INTERFEROMETER

CROSS-REFERENCE TO RELATED APPLICATION

This application claims priority to JP Application No. 2014-227166, filed Nov. 7, 2014, the disclosure of which is incorporated in its entirety by reference herein.

TECHNICAL FIELD

The present invention relates to an interferometer using, for example, an infrared light source, a spectrophotometer using the interferometer and a control method for the interferometer.

BACKGROUND ART

An interferometer used, for example, in a spectroscopic unit of a Fourier-transform infrared spectroscopy (referred to as "FTIR" hereinafter) is intended that, light emitted from an infrared light source is split into two light beams. One of the two light beams is reflected by a fixed mirror, while the other is reflected by a reciprocal moving mirror. Then, these light beams are synthesized again to thereby generate an interference wave by an optical path difference.

In this FTIR, the intensity of the synthesized light by this interferometer draws sine curves every different wavelength, when the moving mirror is continuously moved. The synthesized light in this interferometer is spectrally dispersed through Fast Fourier Transform (FFT) to thereby obtain the light intensity of every wavelength (spectrum). Thus, it is adapted to analyze a composition ratio and concentration of a measuring object.

At this time, it is required to measure the interference waveform with accuracy conformable to the FFT operation in this interferometer. It is indispensably necessary to observe a position of the moving mirror with high accuracy.

Thus, the moving mirror is equipped on a predetermined movement mechanism. The moving mirror is configured to be reciprocated at a constant speed in a predetermined section by controlling the movement mechanism with a movement control part.

The movement mechanism is configured of, for example, a cart on which the moving mirror is mounted, a linear guide for supporting the cart reciprocally, and a linear actuator such as a voice coil motor for reciprocating the cart, and the like.

Figure 1:
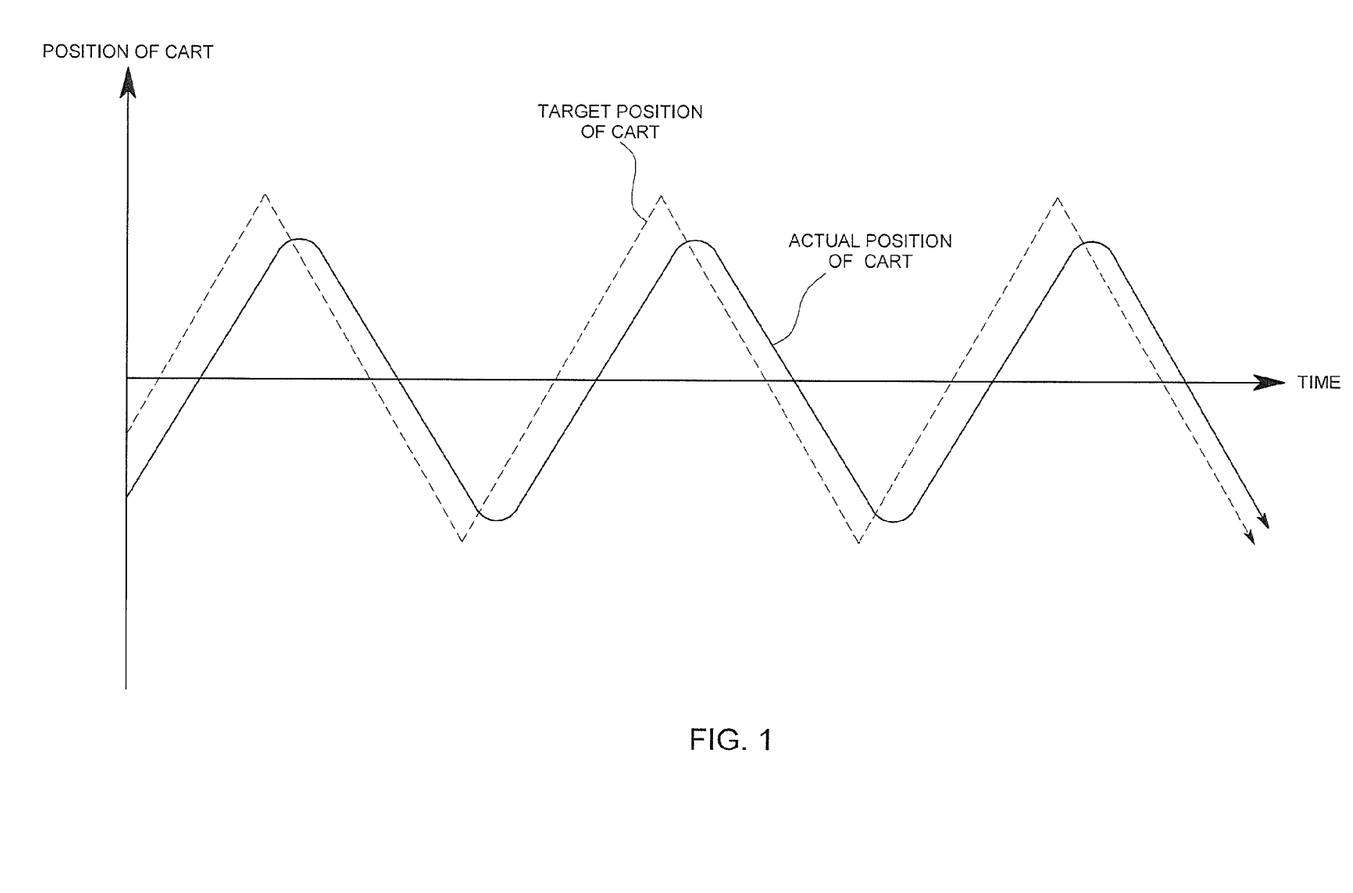
FIG. 1 is a graph showing a relationship between a target position of a conventional moving mirror and a time.

The movement control part is adapted to feedback-control the position of the cart (and the moving mirror). The movement control part is followed by measuring the position of the cart by a position sensor such as a laser displacement measurement system, and generating control signal to the linear actuator so that the measurement position follow to a target position. Since this target position is reciprocated at a constant speed, it is set to depict a triangular waveform (also, referred to as "target position triangular waveform" hereinafter), when a horizontal axis represents a time as shown in FIG. 1.

In such a system, although a constant speed reciprocal movement is targeted, it is necessary that the cart and the moving mirror should be turned back, while being decelerated and accelerated in the around of an apex of the target position triangular waveform at which a forward movement and a backward movement are switched. Therefore, there occurs a turn-back section in which the constant speed cannot be maintained as shown in FIG. 1.

Meanwhile, in recent years, there arises an increased demand for shortening a measurement time, and it becomes necessary to speed up the reciprocal movement of the mirror accordingly.

However, if the reciprocal movement is speeded up, a thrust force at a timing of turn-back is significantly increased. There is concerned a problem that an excessive load is applied to the movement mechanism of the mirror, which results in short life thereof and increasing frequency of breakdowns. For example, If two or three times faster than conventional one is required, but the maximum instantaneous thrust force required for the turning back of the mirror also becomes two or three accordingly. Therefore, deformation of the voice coil constituting the movement mechanism and wear of a steel ball of the linear guide become remarkable, results in negative influence on the product lifetime are caused and the breakdowns become easily occur.

Further, since the time required for turning back the cart becomes shorter in accordance with the faster speed, the time elapsed from the turned of the cart up to the movement at a constant speed becomes also shorter. It results in that speed stability of the cart is deteriorated, but also the measurement accuracy is deteriorated.

SUMMARY OF INVENTION

Technical Problem

Therefore, the present invention has been made in order to solve the above problems. An essential subject thereof is to provide an interferometer and the like capable of ensuring the speed stability of the movable mirror while achieving the speed up of the reciprocal movement of the moving mirror and suppressing the increment of the maximum instantaneous thrust force required for the turning back as much as possible.

Solution to Problem

That is, an interferometer according to the present invention includes: a moving mirror; a movement mechanism for reciprocating the moving mirror; movement control part for controlling the movement mechanism and allowing the moving mirror to be reciprocated at a constant speed; and a measurement part for measuring a position of the moving mirror. In this configuration, the movement control part is adapted to receive target position data indicating a target position of the moving mirror, and control the movement mechanism so as to bring the measurement position of the moving mirror measured by the measurement part close to the target position indicated by the target position data. A time-varying waveform of the target position indicated by the target position data is formed into a trapezoidal waveform by horizontally cutting apex portions of the triangular waveform, or is further formed into a smooth wave by rounding away the corner points of the trapezoidal waveform, while a graph waveform in the case where a vertical axis represents the target position and a horizontal axis represents a time.

In this interferometer of the present invention, since the time-varying waveform of the target position forms the trapezoidal waveform or forms a shape of the trapezoidal waveform with its corner portions smoothly changed, a timing of starting deceleration becomes before the apex of the triangular waveform indicating the conventional target position. Thus, the time required for the turn-back operation can be longer than that in the conventional interferometer. Therefore, the speed stability after acceleration is improved, and not only the speed stability of the moving mirror can be ensured even if the reciprocation speed of the moving mirror is made faster, but also the performance related to the measurement accuracy of the interferometer can be maintained.

Moreover, in the conventional case, since the target position is the apex of the triangular waveform at the timing of turn-back operation, the target position is rapidly changed, and an excessive load is applied to the movement mechanism by the turn-back operation. Whereas, according to the present invention, since the time-varying waveform of the target position forms a trapezoidal waveform or forms a shape by smoothly changing the corner portions of the trapezoidal waveform and the change at the timing of turn-back operation is made moderate, the load applied to the movement mechanism can be decreased, and short-life and increment of breakdown frequency on the movement mechanism can be prevented in spite of faster reciprocation speed of the moving mirror. Particularly, this effect becomes remarkable in the case where the corner portions of the trapezoidal waveform of the time-varying waveform of the target position is made smooth.

As a more specific embodiment, there can be exemplified a configuration that, the movement control part further includes a target position data generation part for generating target position data. The target position data generation part calculates the target position based on an original target position having a triangular waveform shaped time-varying waveform and outputs the target position data indicating the target position.

With this configuration, only by inputting original target position data indicating an original target position of a triangular waveform shaped temporally varying waveform to the target position data generation part, it is possible to generate the target position data of a time-varying waveform forming a trapezoidal waveform by horizontally cutting apex portions of a triangular waveform, or forming a shape of the trapezoidal waveform with its corner portions smoothly changed to thereby easily generate the target position data.

As an embodiment to have a particularly remarkable effect of the present invention, there can be exemplified a configuration follows. The target position data generation part includes: a first-stage reference governor part for receiving the original target position data indicating the original target position, and calculating an intermediate target position of a time-varying waveform that forms a trapezoidal waveform by cutting apex portions of the triangular waveform indicated by the original target position data; and a second-stage reference governor part for calculating the target position having a waveform of the trapezoidal waveform with its corner portions smoothly changed by applying a process of low-pass filter to the time-varying waveform of the intermediate target position.

With this configuration, the first-stage reference governor part is possible to calculate an intermediate target position of a time-varying waveform of a trapezoidal wave formed by horizontally cutting the apex of the triangular wave. And the second-stage reference governor part is also possible to easily generate a target position having a time-varying waveform of the trapezoidal waveform of the intermediate target position with its corner portions smoothly changed.

Also, a spectrophotometer using the above interferometer is one of the present invention.

With this spectrophotometer, the speed stability of the moving mirror can be ensured, even if the reciprocation speed of the moving mirror is intended to be faster to shorten the measurement time. Therefore, it is possible to obtain data with high reliability.

Further, a control program of the above interferometer is a program for controlling the interferometer which includes: a moving mirror; a movement mechanism for reciprocating the moving mirror; movement control part for controlling the movement mechanism and allowing the moving mirror to be reciprocated at a constant speed; and a measurement part for measuring a position of the moving mirror. The control program exhibits functions as the movement control part adapted to receiving target position data indicating a target position of the moving mirror, and controlling the movement mechanism so as to bring the measurement position of the moving mirror measured by the measurement part follows the target position indicated by the target position data, and setting a time-varying waveform of the target position indicated by the target position data so as to be formed into a trapezoidal waveform, from a triangular waveform by horizontally cutting apex portions of the triangular waveform, or be further formed into a smooth waveform by rounding away the corner points of the trapezoidal waveform.

Advantageous Effects of Invention

According to the interferometer, the spectrophotometer using the interferometer and control program of the interferometer of the present invention, while achieving the speed up of the reciprocal movement of the moving mirror, the increment of the maximum instantaneous thrust force required for the turning-back is suppressed as much as possible. Further, it allows to maintain the life performance, prevent a breakdown, and it is possible to ensure the speed stability of the moving mirror and prevent deterioration of the measurement accuracy.

BRIEF DESCRIPTION OF THE DRAWINGS

FIG. 6 (*a*) is an enlarged view of a portion A in FIG. 5;

FIG. 6 (*b*) is an enlarged view of a portion A in FIG. 5;

FIG. 7 (*a*) is a graph when a vertical axis represents a position and speed of the moving mirror and a horizontal axis represents a time in the conventional interferometer;

FIG. 7 (*b*) is a graph when a vertical axis represents a position and speed of the moving mirror and a horizontal axis represents a time in the interferometer of the present embodiment.

DESCRIPTION OF EMBODIMENTS

The following describes an embodiment of the present invention referring to the accompanying drawings.

Figure 2:
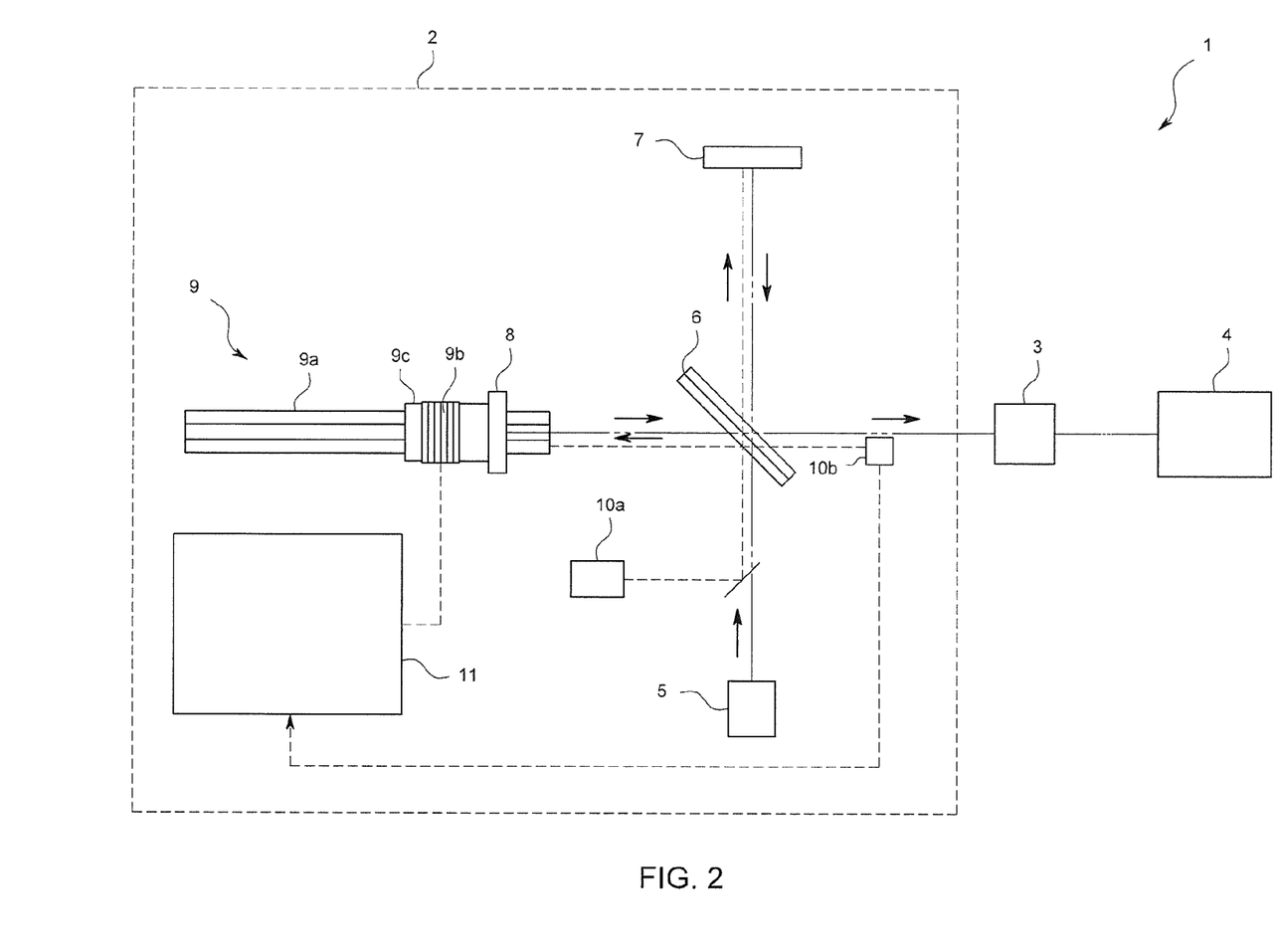
FIG. 2 is a schematic diagram showing a spectrophotometer and an interferometer in the present embodiment.

A spectrophotometer 1 of the present embodiment is, for example, a FTIR, and as shown in FIG. 2. An interference wave depicting different sine curves for each wavelength generated by an interferometer 2 is incident to a measurement sample placed on a sample stage 3. The light transmitted through the measurement sample is dispersed through Fast Fourier Transform (FFT) in an analyzing part 4 to thereby obtain the light intensity of every wavelength (spectrum). Thus, it is adapted to analyze a composition ratio and concentration of the measurement sample.

As a configuration of generating an interference wave depicting different sine curves for every wavelength, the interferometer 2 of the present embodiment splits light that emitted from an infrared light source 5 into two light beams through a beam splitter 6. Then, while one of the light beams is reflected by a fixed mirror 7, the other of the light beams is reflected by a moving mirror 8 which is reciprocated by a movement mechanism 9. At this time, since the moving mirror 8 is continuously moved by the movement mechanism 9, the interference wave obtained by synthesizing the light beam reflected by the fixed mirror 7 and the light beam reflected by the moving mirror 8 depicts different sine curves for every wavelength.

The movement mechanism 9 includes a linear guide 9a placed in parallel on one of optical axes which are split by a beam splitter 6, a cart 9c moving on the linear guide 9a, and a linear actuator 9b such as a voice coil motor for reciprocating the cart 9c. The moving mirror 8 is mounted on this cart 9c so as to intercept the optical axis.

Thus, a moving speed of the cart 9c is varied based on a current value flowing to the linear actuator 9b, and a moving direction of the cart 9c is changed depending on a flowing direction of the current.

Note that the linear actuator 9b is not limited to the voice coil motor and any may be used so long as it reciprocates the cart 9c.

A measurement part 10 for measuring a position of the moving mirror 8 which is moved by the movement mechanism 9 is a position sensor. The measurement part 10 includes, for example, a measuring light source 10a and a light receiving part 10b for receiving the light. This position sensor can be an example of measuring a position of the moving mirror 8, utilizing the fact that a frequency of the light from the measuring light source 10a is varied by Doppler effect occurring at a time of reflecting the light by the moving mirror 8. Then, the measurement part 10 transmits actual position data indicating a measured measurement position to a control mechanism 11.

Note that, in addition to the position sensor mentioned above, a velocity sensor or an acceleration sensor, or the like can be also used as the measurement part 10.

Figure 3:
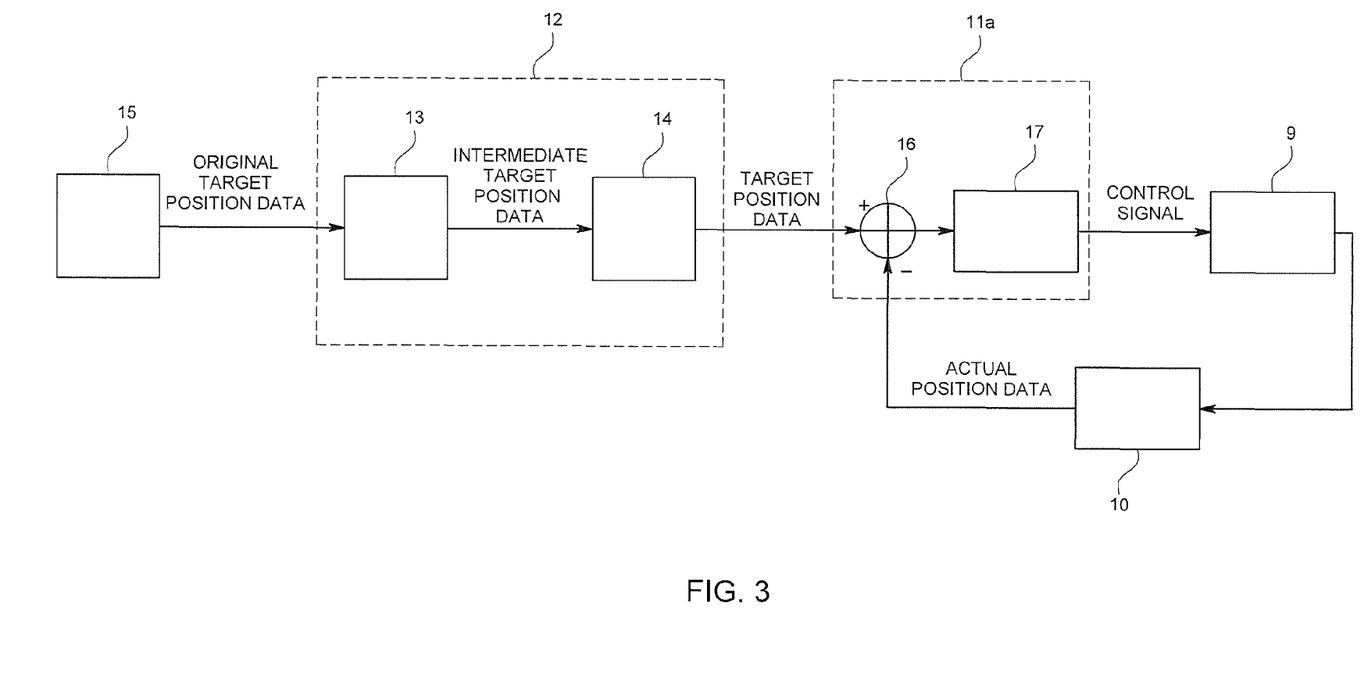
FIG. 3 is a block diagram showing a target position data generation part in the present embodiment.

The control mechanism 11 is intended to control the movement mechanism 9. It is structurally a so-called computer circuit having a CPU, an internal memory, an I/O buffer circuit, an AD converter and the like. Thus, by operating in accordance with a control program stored in a predetermined region of the internal memory, the CPU and peripheral equipment are cooperated to thereby exhibit a function as a movement control part 11a as shown in FIG. 3.

The movement control part 11a is intended to control the movement mechanism 9 by generating a control signal so as to move the moving mirror 8 to a target position and sending the control signal to the movement mechanism 9. More specifically, the movement control part 11a includes a deviation calculating part 16 for calculating a deviation between a target position of the moving mirror 8 and a measurement position measured by the measurement part 10, and a computing part 17 for calculating the control signal so as to bring the measurement position close to the target position by reducing the deviation.

This target position is generated using a target position data generation part 12. The target position data generation part 12 is intended to generate target position data indicating a target position and includes a first-stage reference governor part 13 for calculating an intermediate target position from an original target position, and a second-stage reference governor part 14 for calculating the target position from the intermediate target position.

In the present embodiment, the original target position is stored in an original target position data storage part 15. When representing this original target position in a graph of a vertical axis representing a position and a horizontal axis representing a time, a time-varying waveform thereof becomes a symmetrical waveform of a triangular waveform.

Figure 4:
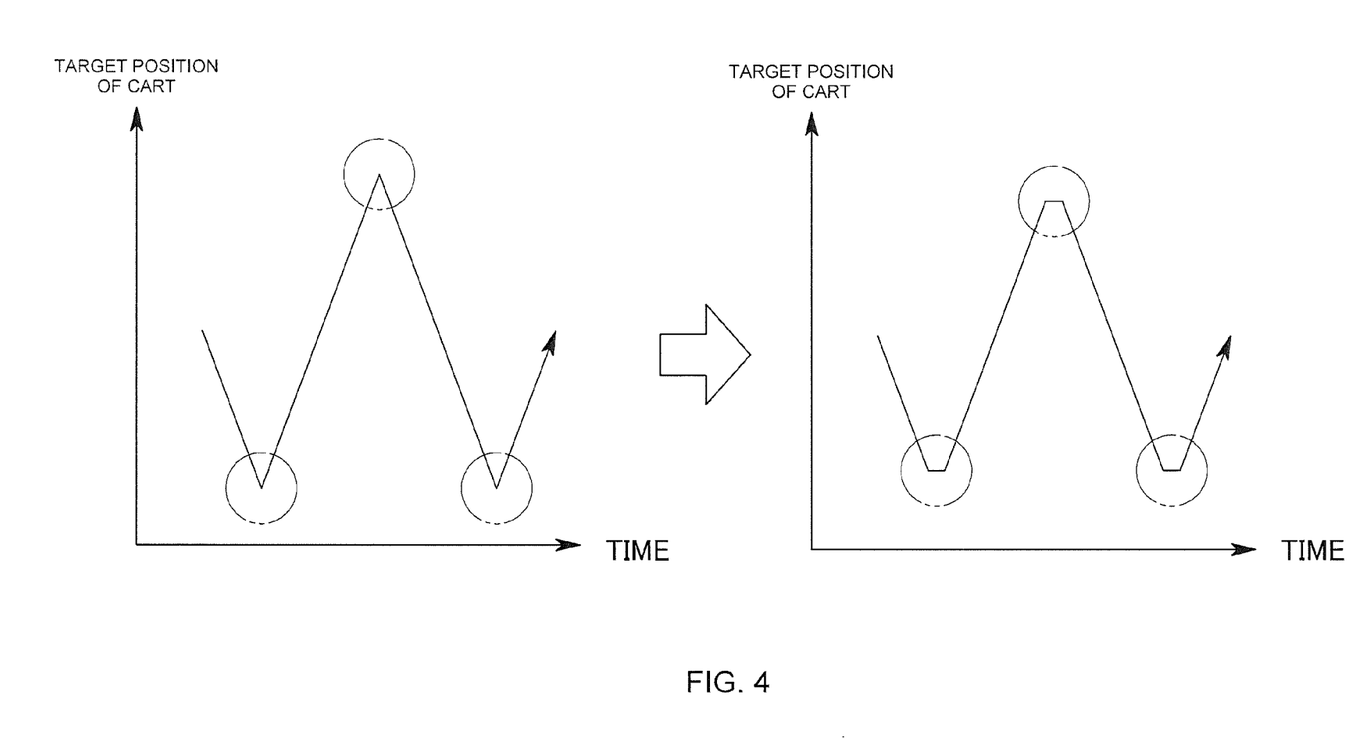
FIG. 4 is a graph showing a time-varying waveform of an intermediate target position generated by a first-stage reference governor part in the present embodiment.

As shown in FIG. 4, the first-stage reference governor part 13 is intended to acquire the original target position data indicating the original target position from the original target position data storage part 15, and cut apex portions of the triangular wave of the temporally varying waveform of the acquired original target position to thereby calculate the intermediate target position having a temporally varying waveform of a trapezoidal waveform. Specifically, the first-stage reference governor part 13 cuts apex portions of the triangular wave to maintain the section of a specific length that a moving mirror 8 moves at a constant speed in order to perform a measurement with an interferometer. That is, the first-stage reference governor part 13 removes the apex of the triangular waveform by cutting the range that lies between the peak of the apex and the constant speed section before and after the apex.

Figure 5:
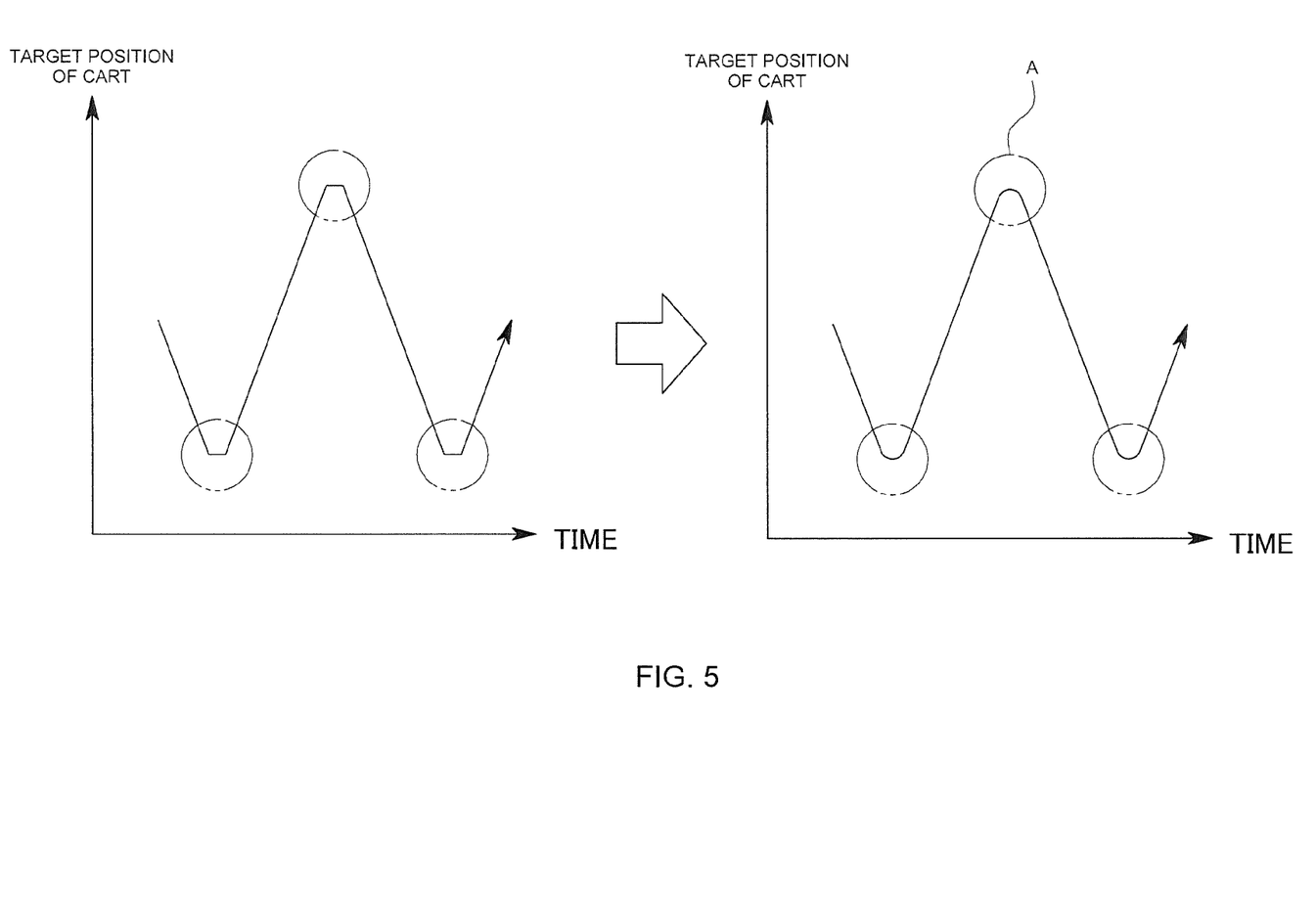
FIG. 5 is a graph showing a time-varying waveform of a target position generated by a second-stage reference governor part in the present embodiment.

As shown in FIG. 5, second-stage reference governor part 14 is intended to calculate the target position with the corner portions of the trapezoidal waveform of the time-varying waveform smoothly changed by applying a process of a low-pass filter to the time-varying waveform of the intermediate target position that is calculated by the first-stage reference governor part 13. At this time, a FIR filter or an IIR filter can be used as the low-pass filter.

Figure 6A:
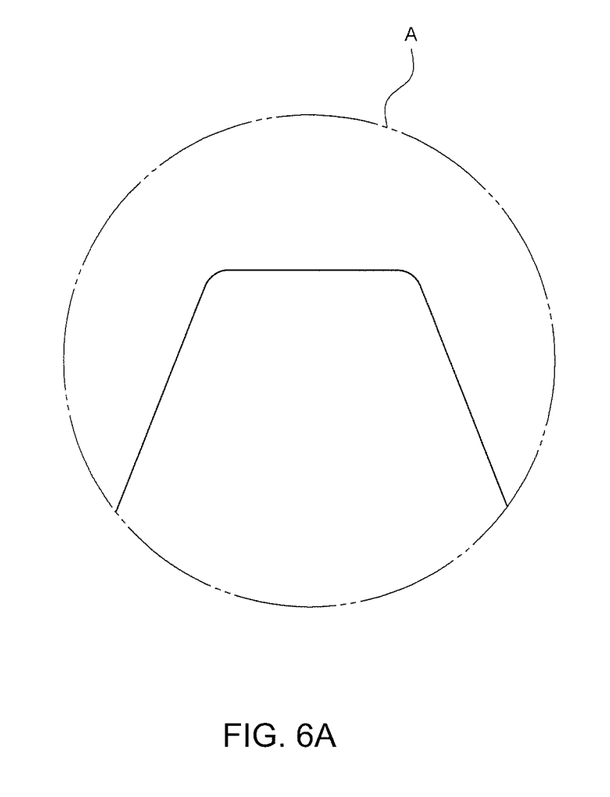
Figure 6B:
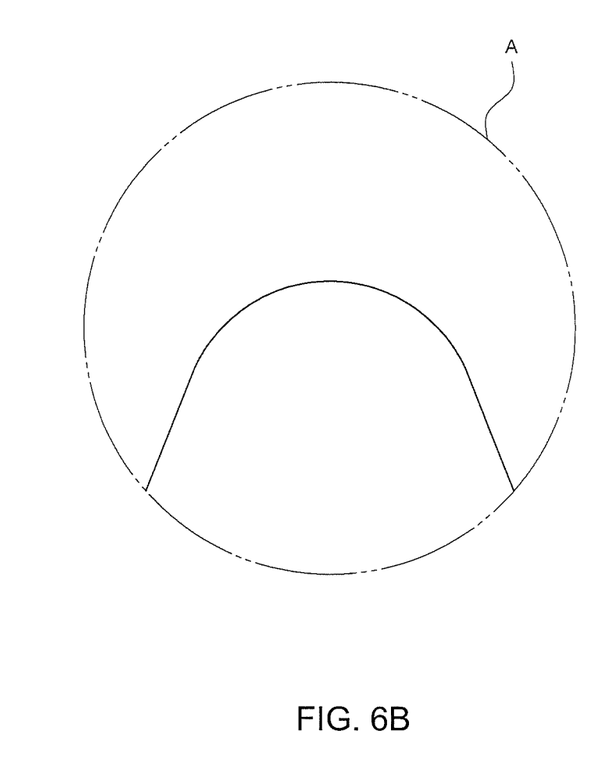

Further, the time-varying waveform of the target position calculated by applying a process of a low-pass filter may be a trapezoidal waveform of the intermediate target position with its corner portions smoothly changed while its horizontal portion remaining as shown in FIG. 6(*a*), or may be the same while its horizontal portion not remaining as shown in FIG. 6(*b*).

Figure 7A:
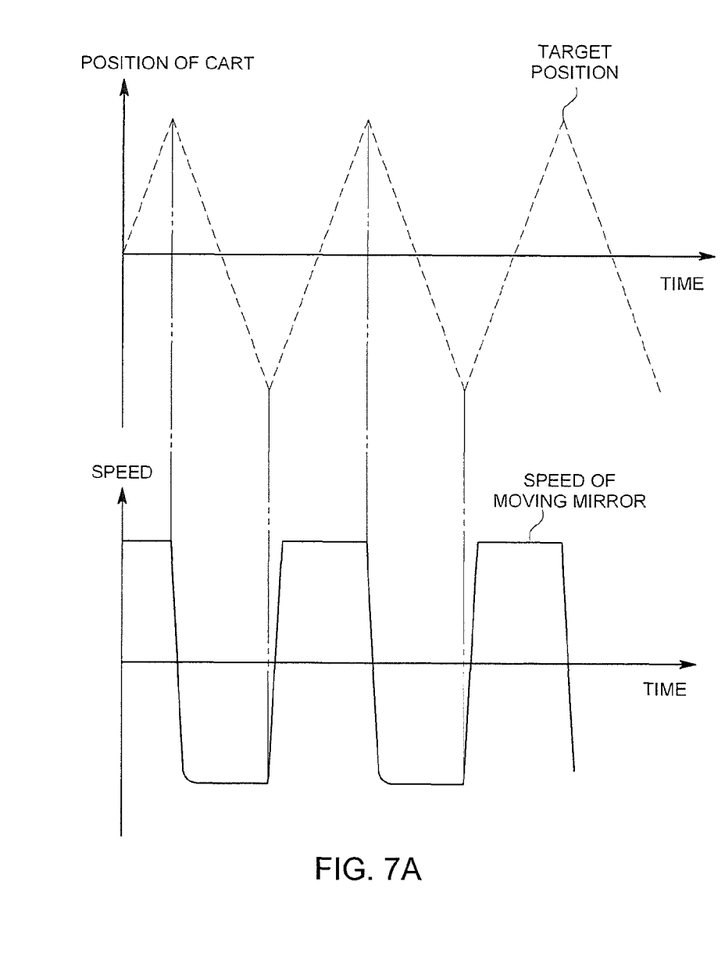
Figure 7B:
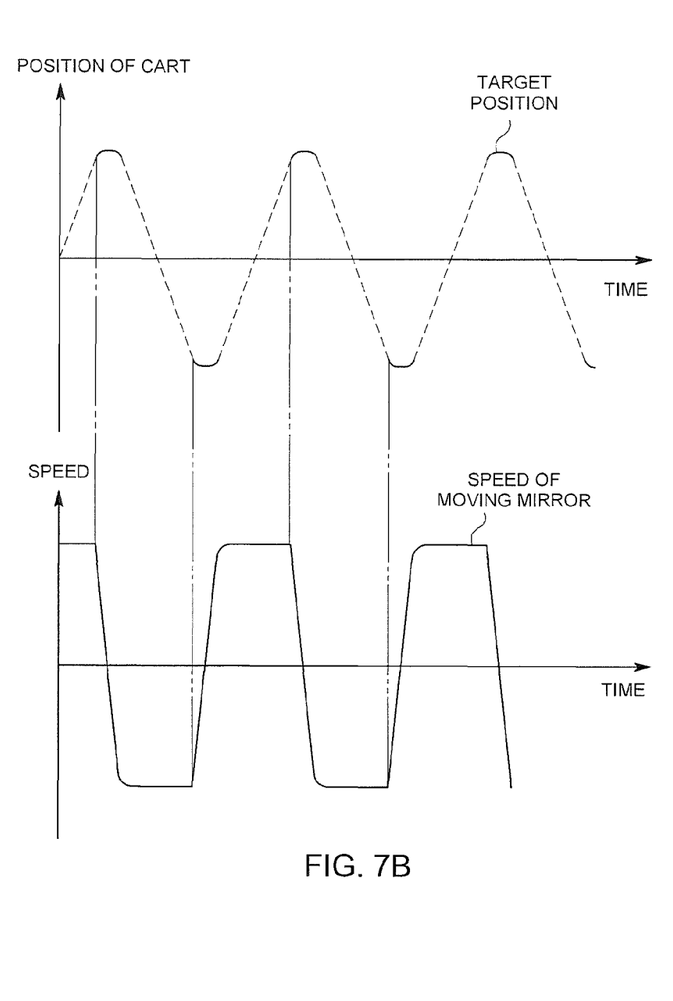

In the above target position data generation part 12, the time-varying waveform of the target position indicated by the target position data via the first-stage reference governor part 13 and the second-stage reference governor part 14 represents a trapezoidal waveform formed by horizontally cutting apex portions of a triangular wave with the corner portions of the trapezoidal waveform smoothly changed, as shown in FIG. 7(*b*). It is understood that, by making the time-varying waveform of the target position as shown in FIG. 7(*b*), a timing of starting deceleration of the moving mirror 8 is made faster than in the conventional interferometer shown in FIG. 7(*a*), and the time required for turning-back the moving mirror 8 can be increased. Moreover, it is understood that a predetermined constant speed section is provided as to the speed of the moving mirror 8 controlled on the basis of the target position as described above.

The interferometer 2 of the present embodiment configured as described above has remarkable effects as follows.

That is, in the interferometer 2 of the present embodiment, the time-varying waveform of the target position is a trapezoidal waveform with its corner portions smoothly changed. Then, the timing of starting deceleration is before the apex of the triangular waveform which is a conventional target position to thereby obtain a longer time required for the turn-back operation than in the conventional interferometer. Therefore, the speed stability after acceleration is improved, and even if the reciprocation speed of the moving mirror 8 is intended to be made faster, the speed stability of the moving mirror 8 can be ensured and the performance related to the measurement accuracy of the interferometer 2 can be maintained accordingly.

Further, since the time-varying waveform of the target position is a trapezoidal waveform or a shape with its corner portions smoothly changed to thereby moderate the change at the timing of turning-back operation, an excessive force is suppressed from being applied to the movement mechanism 9. Then, it is possible to prevent short life and increment of breakdown frequency of the movement mechanism 9 in spite of speed up in reciprocating the moving mirror 8.

Furthermore, only by inputting the original target position data indicating the original target position of a time-varying waveform of a triangular waveform, it is possible to generate the target position data of the time-varying waveform of a trapezoidal waveform formed by horizontally cutting apex portions of a triangular waveform or a trapezoidal waveform with its corner portions smoothly changed, and the target position data can be easily generated.

Next, a spectrophotometer 100 of another embodiment will be described. Note that the same parts as in the description of the spectrophotometer 1 are designated by the same reference numerals and the description thereof is omitted.

Figure 8:
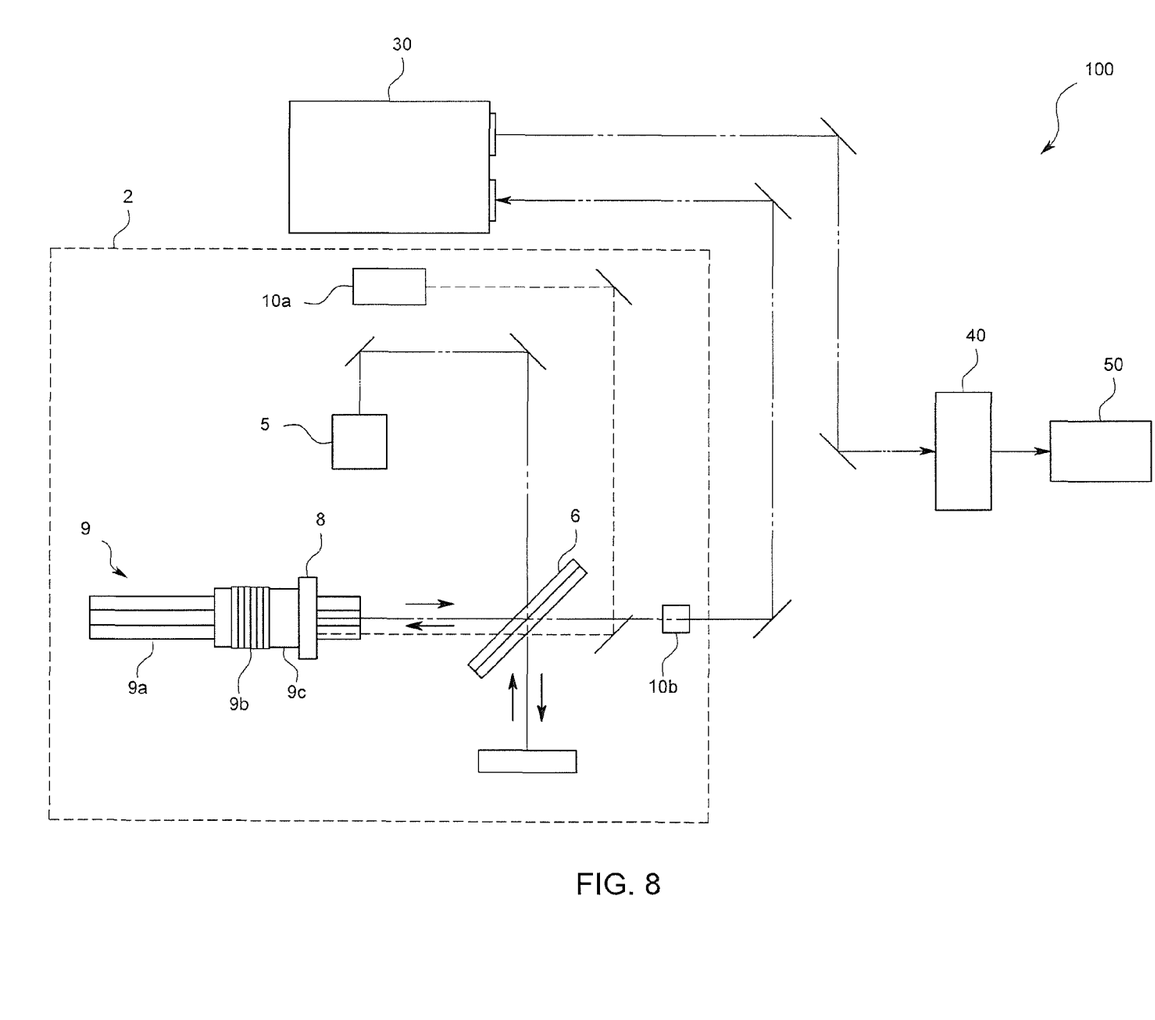
FIG. 8 is a schematic diagram showing a spectrophotometer and an interferometer in another embodiment.

FIG. 8 is a schematic view showing the spectrophotometer 100 in the present embodiment. The spectrophotometer 100 in the present embodiment includes: an interferometer 2; a gas cell 30 for accommodating a measurement sample; a detector 40 for detecting light transmitted through the gas cell 30; and a measurement part 50 for measuring a concentration of a measurement sample by Fourier-transforming a signal intensity of the light detected by the detector 40. Note that, a light source 5 of the interferometer 2 is adapted to emit the light of an infrared wavelength region. Further, as a measurement sample, for example, exhaust gas of an automobile and the like may be used.

The gas cell 30 is intended to allow interference light generated by the interferometer 2 to be transmitted through a sample within the cell. It is formed in a housing shape. This gas cell 30 is provided with an incident window to be incident the interference light generated by the interferometer 2, and an exit window to transmit the interference light.

The detector 40 is intended to detect a signal intensity of the light that has been transmitted through the sample within the gas cell 30. For example, a semiconductor type sensor and a pyroelectric type sensor are used therefor.

The measurement part 50 is intended to separate light intensities of respective wavenumber components through Fourier transform of the intensity signals of the light detected by the detector 40. Then, the concentration of the sample is intended to be measured based on the Lambert-Beer Law that the absorbance and concentration of each wavenumber are proportional.

The present invention should not be limited to the configurations described above.

Although the target position data generation part is provided in the above embodiments, the target position data may be generated without using the target position data generation part. In this case, the target position data is generated by, for example, inputting a target position on a table or using an equation that represents the target position. In the case where the target position is generated without using the target position data generation part, it is possible to generate a target position of a time-varying waveform of a desired shape.

Further, the target position data generation part may be configured of only the first-stage reference governor part. Thus, although the time-varying waveform of the target position becomes a trapezoidal waveform, even in this case, since the timing of starting deceleration becomes before the apex of the triangular waveform of the conventional target position. Then, the time required for re-acceleration becomes shorter and the speed stability after acceleration can be maintained.

Note that the control mechanism may include a stability diagnostic part for calculating a speed stability index indicating speed stability of the movement mechanism (i.e., moving mirror).

In the case where this stability diagnostic part determines that the measurement position measured by the measurement part has reached a constant speed movement start position, the speed stability index is calculated using the actual position data transmitted from the measurement part in a predetermined section from the constant speed start position.

This speed stability index is expressed by the following equation.

$$V_O = \frac{Vstdevp}{Vavr} \times n$$

Where Vstdevp is a standard deviation of the speed of the movement mechanism, Vavr is an average value of the movement mechanism, n is a natural number.

In this embodiment, n=3 is used.

By providing the stability diagnostic part in this way, the speed stability of the movement mechanism (i.e., moving mirror) can be evaluated. Therefore, in the case where the time-varying waveform of the target position is formed in a shape of a trapezoidal waveform with the apex portions of the triangular waveform horizontally cut and the corner portions thereof smoothly changed, it is possible to confirm whether or not the speed stability of the movement mechanism (i.e., moving mirror) can be ensured, specifically, whether or not the performance related to the measurement accuracy of the interferometer can be maintained.

Moreover, it is not always necessary for the first-stage reference governor part to horizontally cut the apex portions of the triangular waveform, it may be also configured to cut the apex portions obliquely.

In addition, various modifications of the embodiments can be made without departing from the spirit of the present invention.

REFERENCE SIGNS LIST

2 . . . Interferometer
8 . . . Moving mirror

9 . . . Movement mechanism
10 . . . Measurement part
11a . . . Movement control part

What is claimed is:

1. An interferometer comprising:
   a moving mirror;
   a movement mechanism for reciprocating the moving mirror;
   a measurement part for measuring a position of the moving mirror; and
   one or more controllers programmed to receive original target position data indicating an original target position for the moving mirror that is shown as a time-varying triangular waveform, to generate target position data indicating a target position for the moving mirror by cutting apex portions of the triangular waveform, and to control the movement mechanism based on the target position data so as to bring a position of the moving mirror measured by the measurement part close to the target position and such that the moving mirror reduces its speed short of the apex portion of the triangular waveform.

2. The interferometer according to claim 1, wherein the one or more controllers are further programmed to calculate a deviation between the target position of the moving mirror and the position measured by the measurement part.

3. The interferometer according to claim 2, wherein the one or more controllers are further programmed to apply a process of a low-pass filter.

4. A spectrophotometer comprising:
   the interferometer according to claim 1; and
   an analyzer adapted to analyze a measurement sample by obtaining light intensity of light which is generated by the interferometer and is transmitted through the measurement sample.

5. A tangible computer readable medium including instructions that, when executed by one or more processors, cause the one or more processors to receive original target position data indicating an original target position for a moving mirror of an interferometer that is shown as a time-varying triangular waveform, generate target position data for the moving mirror by cutting apex portions of the triangular waveform, and control a movement mechanism of the interferometer that reciprocates the moving mirror based on the target position data so as to bring a position of the moving mirror measured by a measurement part of the interferometer close to the target position and such that the moving mirror reduces its speed short of the apex portion of the triangular waveform.

6. A method of controlling an interferometer comprising:
   measuring a position of a moving mirror of the interferometer;
   receiving original target position data indicating an original target position of the moving mirror that is shown as a time-varying triangular waveform;
   generating target position data indicating a target position of the moving mirror by cutting apex portions of the triangular waveform; and
   controlling a movement mechanism of the interferometer that reciprocates the moving mirror based on the target position data so as to bring a position of the moving mirror measured by a measurement part of the interferometer close to the target position and such that the moving mirror reduces its speed short of the apex portion of the triangular waveform.

* * * * *